US006026411A

United States Patent [19]
Delp

[11] Patent Number: 6,026,411
[45] Date of Patent: Feb. 15, 2000

[54] METHOD, APPARATUS, AND COMPUTER PROGRAM PRODUCT FOR GENERATING AN IMAGE INDEX AND FOR INTERNET SEARCHING AND QUERYING BY IMAGE COLORS

[75] Inventor: Helen Roxlo Delp, Rochester, Minn.

[73] Assignee: International Business Machines Corporation, Armonk, N.Y.

[21] Appl. No.: 08/965,621

[22] Filed: Nov. 6, 1997

[51] Int. Cl.[7] .................................................. G06F 17/30
[52] U.S. Cl. .............................. 707/104; 707/3; 382/162; 382/169
[58] Field of Search .................. 707/1, 3, 101, 707/104; 382/162, 169

[56] References Cited

U.S. PATENT DOCUMENTS

| | | | |
|---|---|---|---|
| 4,743,959 | 5/1988 | Fredericksen | 358/11 |
| 5,091,718 | 2/1992 | Beatty | 340/703 |
| 5,155,589 | 10/1992 | Gere | 358/81 |
| 5,204,665 | 4/1993 | Bollman et al. | 340/703 |
| 5,289,297 | 2/1994 | Bollman et al. | 358/537 |
| 5,502,458 | 3/1996 | Braudaway et al. | 345/153 |
| 5,509,111 | 4/1996 | Hong et al. | 395/131 |
| 5,517,334 | 5/1996 | Morag et al. | 358/518 |
| 5,586,197 | 12/1996 | Tsujimura et al. | 382/612 |
| 5,652,881 | 7/1997 | Takahashi et al. | 707/104 |
| 5,670,986 | 9/1997 | Leak | 345/154 |
| 5,889,523 | 3/1999 | Wilcox et al. | 345/357 |

OTHER PUBLICATIONS

Draft International Standard ISO/IEC DIS 10918–1, "Information Technology—Digital Compression and coding of continuous–Tone Still Images", International Organization for Standardization, 1991 International Electrotechnical Commission, 1991.

U.S. patent application Serial No. 08/749,150 filed Nov. 14, 1996 by Helen R. Delp and entitled "Method and Apparatus for Creating a Color Name Dictionary and for Querying an Image by Color Name".

Corridoni et al, Pyramid Retrieval by Color Perceptive Regions, Visual Languages, 1997, Proceedings. 1997 IEEE Symposium, pp. 205–211, Sep. 1997.

*Primary Examiner*—Thomas Black
*Assistant Examiner*—Frantz Coby
*Attorney, Agent, or Firm*—Joan Pennington

[57] ABSTRACT

A method, apparatus and computer program product are provided for building an image index and for searching and querying by image colors from a plurality of images including images from the internet or other network environment. First an index is built for each of the plurality of images. A selected number of levels is identified for image processing, and an upper resolution and a lower resolution are identified for each of the selected number of levels for image processing. An image is filtered at each selected level. A sample of pixels is acquired and stored at each selected level in the index. At query time, an image color is selected. A entry of the index is acquired. The acquired entry is compared with the selected image color. A match is identified responsive to the acquired entry being near the selected image color.

28 Claims, 12 Drawing Sheets

EXEMPLARY INDEX STRUCTURE 700

| # OF LEVELS 702 |
|---|
|  |

| LEVEL # 704 | LOWER RESOLUTION 706 | UPPER RESOLUTION 708 | # IMPORTANT COLORS 710 | SIZE OF HISTOGRAM BINS 712 | HISTOGRAM THRESHOLD 714 |
|---|---|---|---|---|---|
|  |  |  |  |  |  |

| # OF COLORS 720 |
|---|
|  |

| COLOR # 722 | C1 COLOR SPACE 724 | C2 COLOR SPACE 726 | C3 COLOR SPACE 728 | # OF PIXELS 730 | % OF IMAGE 732 |
|---|---|---|---|---|---|
|  |  |  |  |  |  |

METHOD, APPARATUS, AND COMPUTER PROGRAM PRODUCT FOR GENERATING AN IMAGE INDEX AND FOR INTERNET SEARCHING AND QUERYING BY IMAGE COLORS

FIELD OF THE INVENTION

The present invention relates generally to the data processing field, and more particularly, relates to a method, apparatus and computer program product for generating an image index and for searching and querying by image colors in a network environment, such as for searching and querying by image colors images from the internet.

DESCRIPTION OF THE RELATED ART

Valuable information available on the internet or World Wide Web (WWW) is often difficult or cumbersome and time consuming to use for reviewing internet web pages using current technology.

Images are increasingly being used on the internet for example, in business applications, because of the standard internet viewing software. In an internet work group environment, images are easily distributed over the network and promote collaboration. However, because the files are usually large, management and location can be difficult. Viewing individual images to find the desired one is time consuming. Maintaining a list of key words describing each image is not effective because the desired key words vary with time, location, and industry.

Agents on the internet improve client efficiency by searching over many sites simultaneously for documents or pages containing certain key words. An analogous method of searching for images containing certain features is needed. One attribute of the image that people would like to query is the color contained within the image. A need exists for technology that enables flexible and efficient querying of internet web pages. As used in the following description and claims, querying by image colors includes querying by gray levels in a gray level image.

SUMMARY OF THE INVENTION

A principal object of the present invention is to provide an intelligent method, apparatus and computer program product for building an image index and for querying by image colors images from the internet. Other important objects of the present invention are to provide such methods, apparatus and computer program product for building an image index and for querying by image colors that efficiently and effectively facilitates searching of particular internet web pages and databases to be reviewed; to provide such index building and querying methods, apparatus and computer program product substantially without negative effect; and to provide such index building and querying methods, apparatus and computer program product that overcome many of the disadvantages of prior art arrangements.

In brief, methods, apparatus and computer program product are provided for building an image index and for searching and querying by image colors from a plurality of images including images from the internet or other network environment. First an index is built for each of the plurality of images. A selected number of levels is identified for image processing, and an upper resolution and a lower resolution are identified for each of the selected number of levels for image processing. An image is filtered at each selected level. A sample of pixels is acquired and stored at each selected level in the index. At query time, an image color is selected. An entry of the index is acquired. The acquired entry is compared with the selected image color. A match is identified responsive to the acquired entry being near the selected image color.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
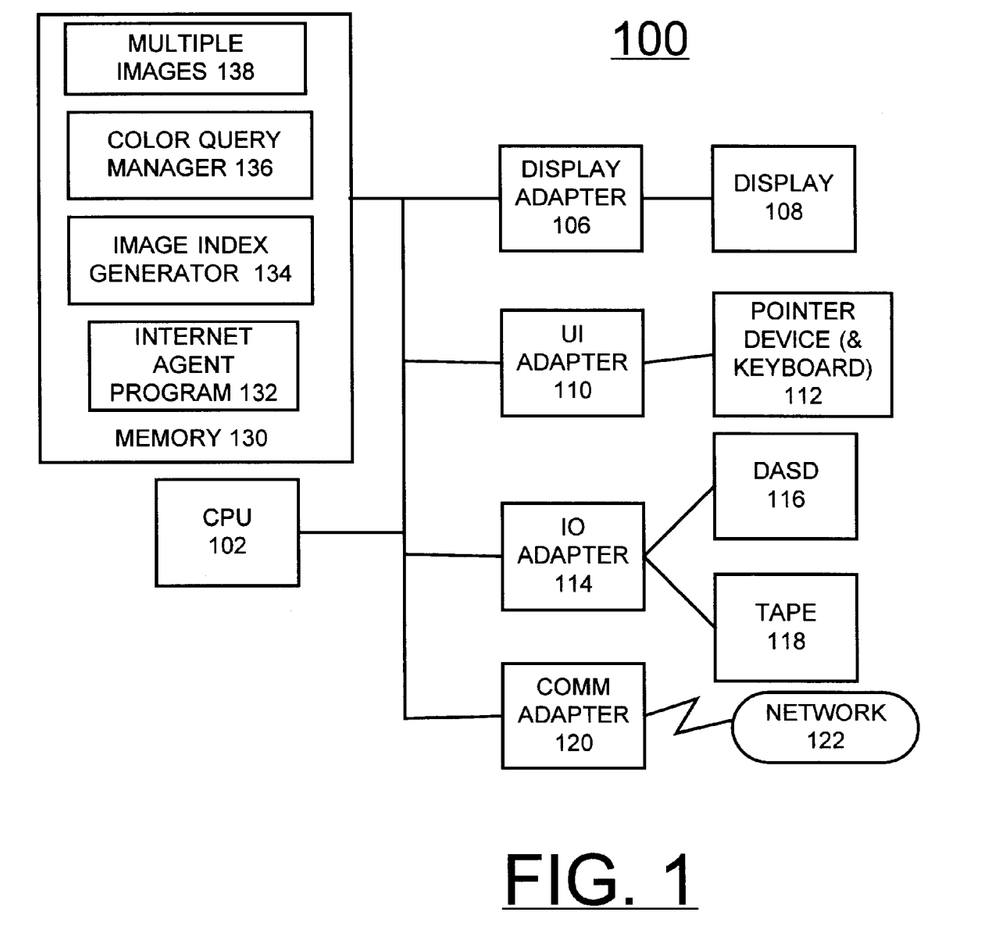
FIG. 1 is a block diagram representation illustrating a computer system for implementing methods for building an image index and for searching and querying by image colors images from the internet in accordance with the preferred embodiment.

Having reference now to the drawings, in FIG. 1, there is shown a computer or data processing system of the preferred embodiment generally designated by the reference character 100. As shown in FIG. 1, computer system 100 includes a central processor unit (CPU) 102, a display adapter 106 coupled to a display 108. CPU 102 is connected to a user interface (UI) adapter 110 connected to a pointer device and keyboard 112. CPU 102 is connected to an input/output (IO) adapter 114, for example, connected to a direct access storage device (DASD) 116 and a tape unit 118. CPU 102 is connected to a communications adapter 120 providing a communications network connection function with a network 122. The computer system 100 includes a memory 130 storing an internet agent program 132, a image index generator 134 of the preferred embodiment, a color query manager 136 of the preferred embodiment, and multiple images 138.

Figure 5:
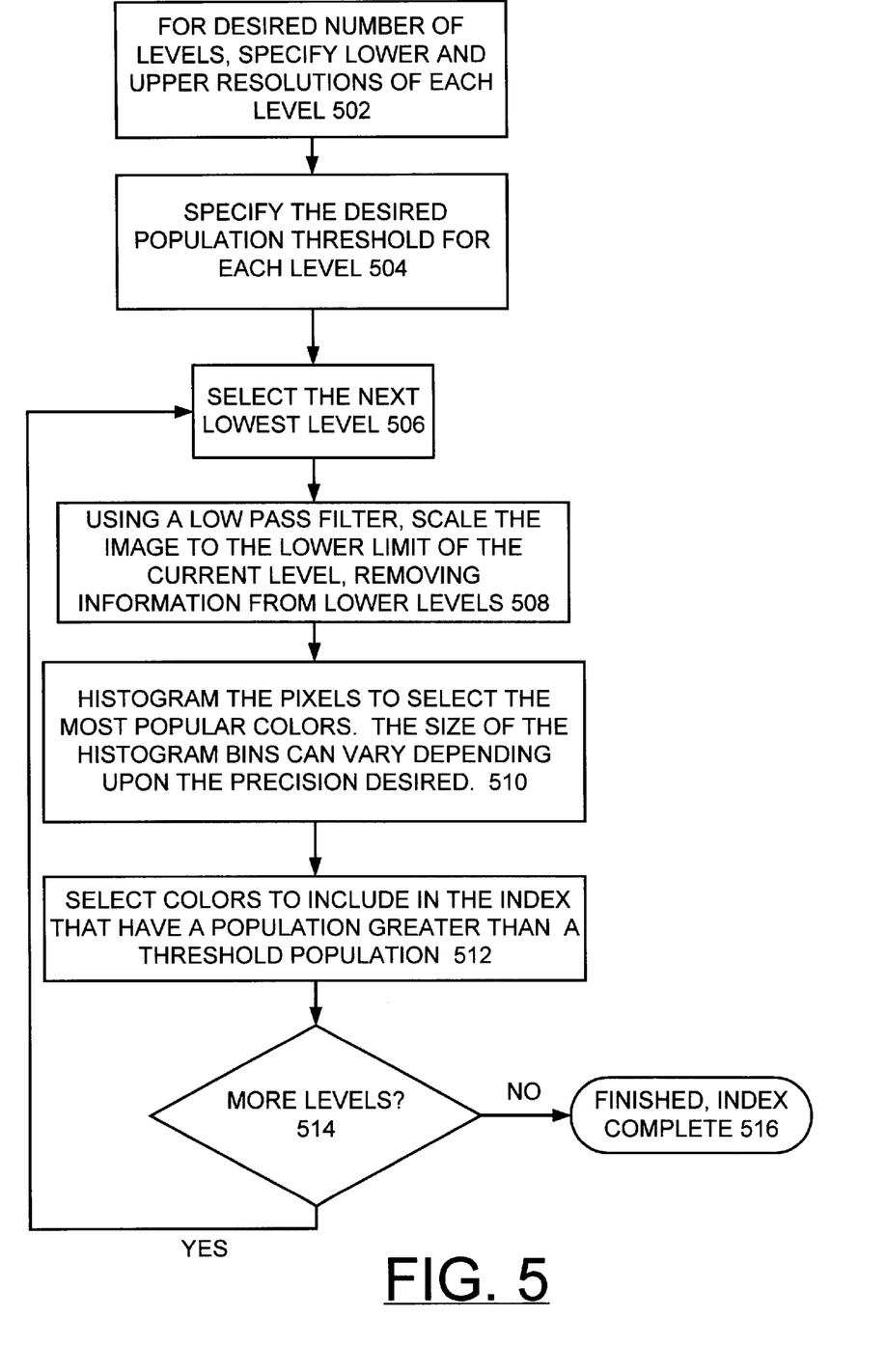
Figure 6:
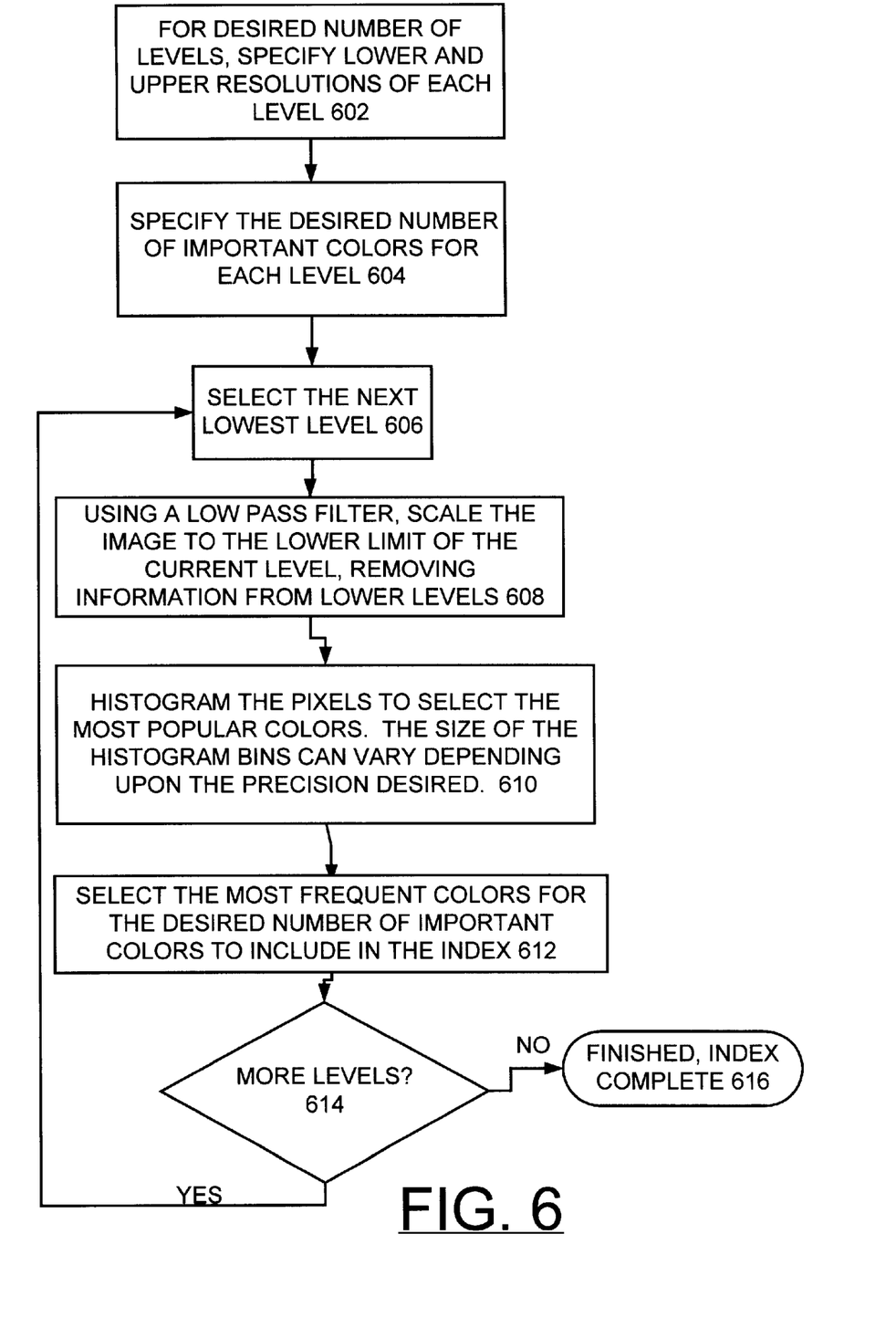
Figure 7:
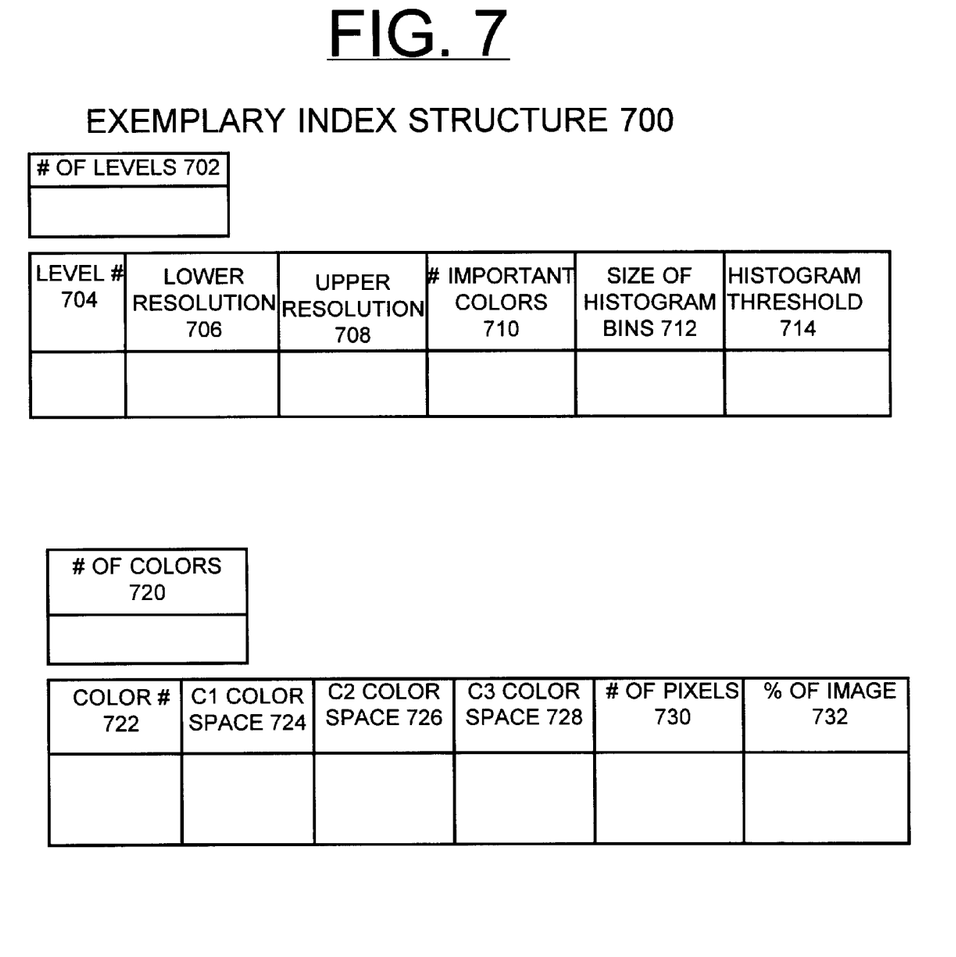
FIG. 7 is a diagram illustrating an exemplary index data structure in accordance with the preferred embodiment.

Central processor unit 102 is suitably programmed to execute the flow charts of FIGS. 2, 3, 4, 5, 6, 8, 9, 10 and 11 of the preferred embodiment and for generating an index structure, such as illustrated and described with respect to FIG. 7.

Computer 100 may be implemented using any suitable computer, such as an IBM personal computer running the OS/2® operating system. Computer 100 could be connected directly to network 122 via communications adapter 120 or could be connected indirectly, such as via a Local Area Network, not shown.

Memory 130 is storage sufficiently large to hold the necessary programming and data structures. While memory 130 is shown as a single entity, memory 130 may in fact comprise a plurality of storage devices, and that memory may exist at multiple levels, from high-speed registers and caches to lower speed but larger DRAM chips, to floppy-disk drives, fixed-disk drives, tape drives, CD-ROM drives, or optical drives. Memory 130 can be loaded and stored between its various levels as needed. While memory 130 is shown as existing entirely in computer 100, memory 130 may in fact be remote memory that exists anywhere in network 122 or in a Local Area Network, not shown.

It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, it should be understood that the invention is not limited to the particular hardware designs, software designs, communications protocols, performance parameters, or application-specific functions disclosed herein.

In accordance with features of the preferred embodiment, internet agent program 132 and image index generator and color query manager 134 enable querying by image colors among multiple images 136, for example, from the internet. The methods of the preferred embodiment can be used with multiple image formats, including (GIF) and Joint Photographic Experts Group (JPEG) image formats.

In accordance with features of the preferred embodiment, first an index of pixel information is build for each image to be used at query time. The content of the index can be user configured based on the industry. The image is scaled using a low pass filter to the first level, for example, 0.05 inch or twenty pixels per inch. This processing step removes the noise variations from the previous level. A random sampling technique can be used to get the desired number of samples at that level. The sampling step is eliminated when a histogram step is used and efficiency is not a concern. The histogram steps provide a histogram of the samples used to select the most popular samples. The size of the histogram bins is varied depending upon the precision desired. This step could be eliminated if the previous sampling step is used and the number of important colors is approximately equal to the number of colors. Then the resulting samples are saved in the index. The index of the preferred embodiment has a defined data structure, such as illustrated and described with respect to FIG. 7.

When searching for a color within an image, the exact color of an individual pixel typically may not provide the desired information from a search. Most images have noise associated with the capture technology which makes the pixel color inaccurate. If the object photographed has texture, like a fabric or an orange or building materials, the texture creates a pattern of light and dark even in regions considered to have constant color that changes the pixel color. If the surface is wrapped around a three dimensional (3D) object, like a model wearing a garment or a building with brick on all sides, or an airplane, regions in the image of constant object surface color would vary because of the lighting and shadows on the 3D object. Averaging colors at a selected level is provided to remove distracting variables and help identify the desired color.

The levels can be varied depending upon a particular industry. For example, in textile fibers and fabrics, a manufacturer may maintain an image database of photographs of fabrics showing solid colors, stripes, plaids, and prints in coordinated colors. This database can be queried utilizing methods of the preferred embodiment to find prints containing the solid color or solid colors matching a plaid. An extract of the image can be maintained after the capture noise is removed. Similarly, an extract can be maintained after texture variations are removed and an extract can be maintained after small resolution patterns are removed.

In accordance with feature of the preferred embodiment, at query time, the agent program 132 takes the information from the index of the starting image, or a color selected by the user in some manner, and searches the indices of all the images in a database generated by the image index generator 134 with the color query manager 136. For example, if the user selects a solid color and wants to find a plaid or patterned fabric containing that color, the agent program 132 searches at a small pattern level, for example of 0.1 to 0.25 inches. The agent 132 defines the desired colors as the colors in the small pattern level of the index of the selected image. Alternatively, in the case of a solid color, this would be only one color. The agent 132 searches all indices for that color at the small pattern level. In the reverse case, where the user wants to find any solid color fabrics that match any of the colors in a pattern, the agent would get several colors from the small pattern level of the starting image index, and search for all fabrics containing any of those colors at the small pattern level. Those fabrics that had only one color at that level would be solids.

Figure 2:
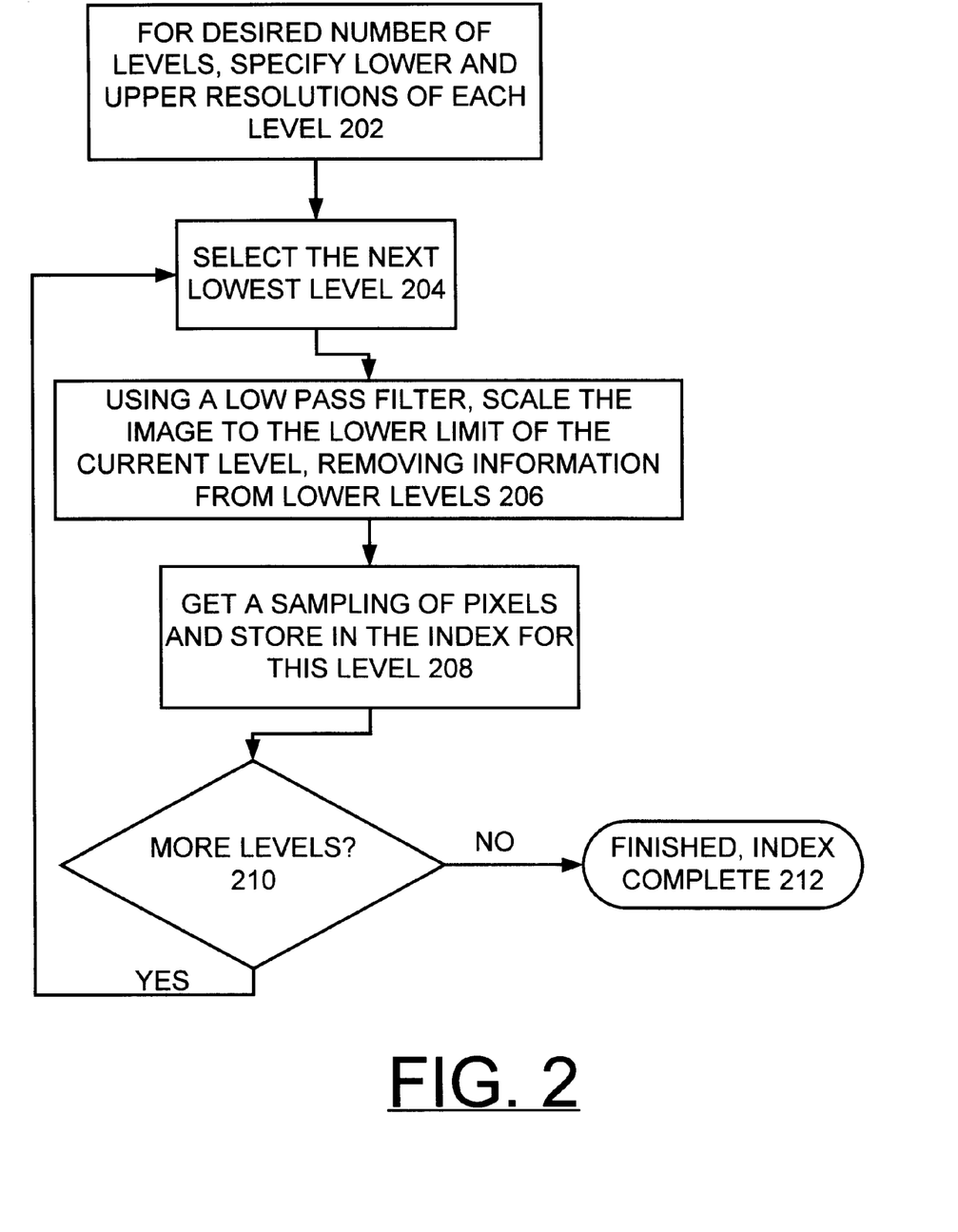
FIGS. 2, 3, 4, 5, and 6 are flow charts illustrating exemplary sequential steps for creating an index used for searching and querying by image colors images from the internet in accordance with the preferred embodiment.

Referring to FIG. 2, there are shown sequential steps for creating an index used for searching and querying by image colors multiple images from the internet in accordance with the preferred embodiment. The method of the preferred embodiment extracts color information from several levels within an image and makes it available for searching. As indicated at a block 202, for each of the desired number of levels, upper and lower resolutions are specified. For example, if working at the small pattern level, defined as containing details on the order of 0.1 inch to 0.25 inch, the lower limit (higher resolution) would be 1 pixel divided by 0.1 inch or ten (10) pixels per inch. The distance is measured in the coordinate system of the details. A next lowest level is selected as indicated at a block 204. Using a low pass filter, the image is scaled to the lower limit (higher resolution) of the current level, removing information from lower levels as indicated at a block 206. For example, when scaling the image to a pixel resolution of ten pixels per inch, any detail of smaller size than 0.1 inch is removed at block 206. Then a sampling of pixels is obtained and stored in the index for this level as indicated at a block 208. Then checking for more levels is performed as indicated at a decision block 210. If there are more levels to process, then the sequential operations return to block 204 to select the next lowest level. When no more levels to process are identified at decision block 210, then the index for the current image is complete as indicated at a block 212. It should be understood that size, scale factors and resolutions can be computed from each other and can provide equivalent information.

Figure 3:
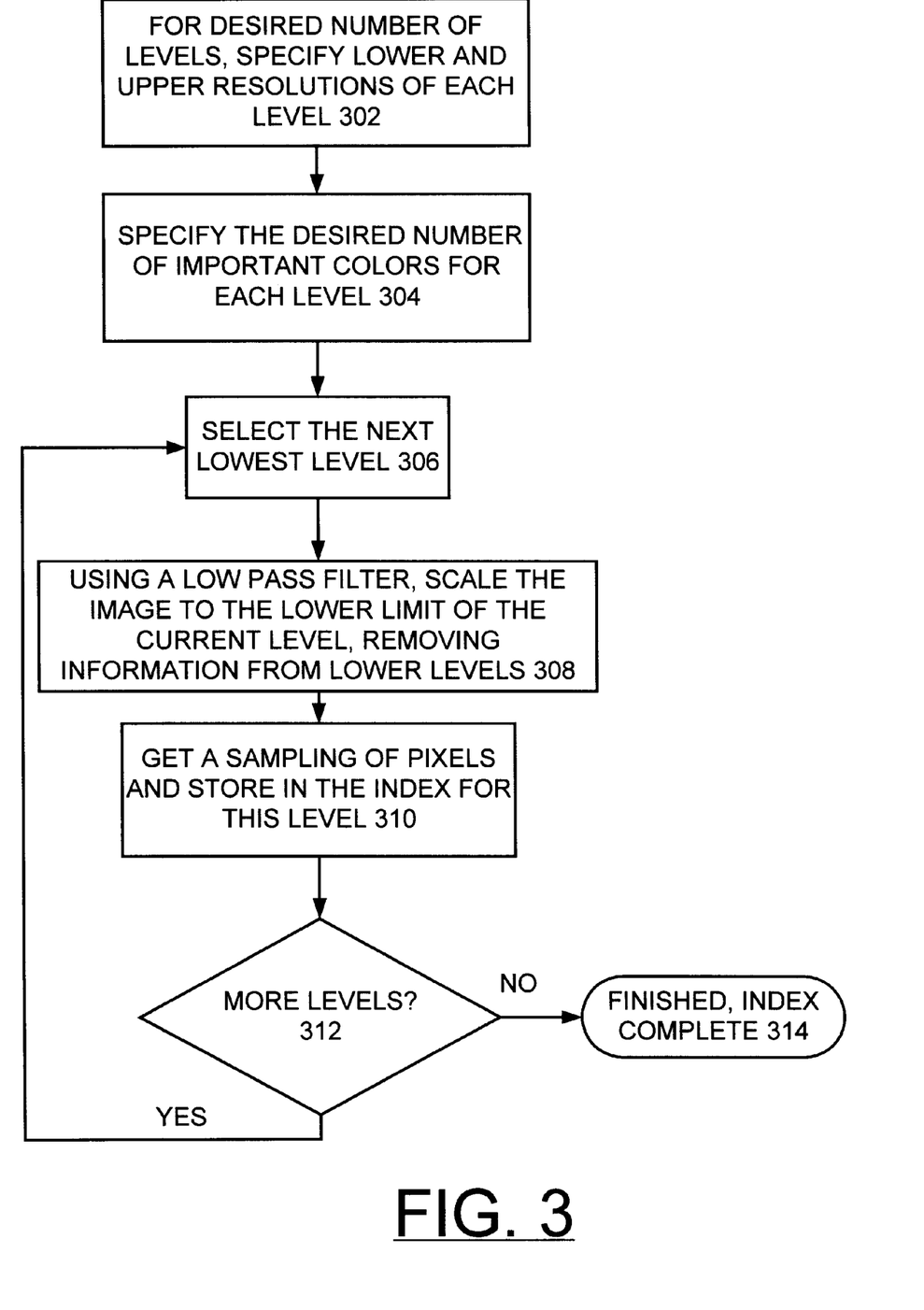

Referring to FIG. 3, there are shown another method of the preferred embodiment for creating an index. As indicated at a block 302, for each of the desired number of levels, upper and lower resolutions are specified. A desired number of important colors for each level is specified as indicated at a block 304. A next lowest level is selected as indicated at a block 306. Using a low pass filter, the image is scaled to the lower limit (higher resolution) of the current level, removing information from lower levels as indicated at a block 308. Then a sampling of pixels is obtained and stored in the index for this level as indicated at a block 310. Then checking for more levels is performed as indicated at a decision block 312. If there are more levels to process, then the sequential operations return to block 306 to select the next lowest level. When no more levels to process are identified at decision block 312, then the index for the current image is complete as indicated at a block 314.

Figure 4:
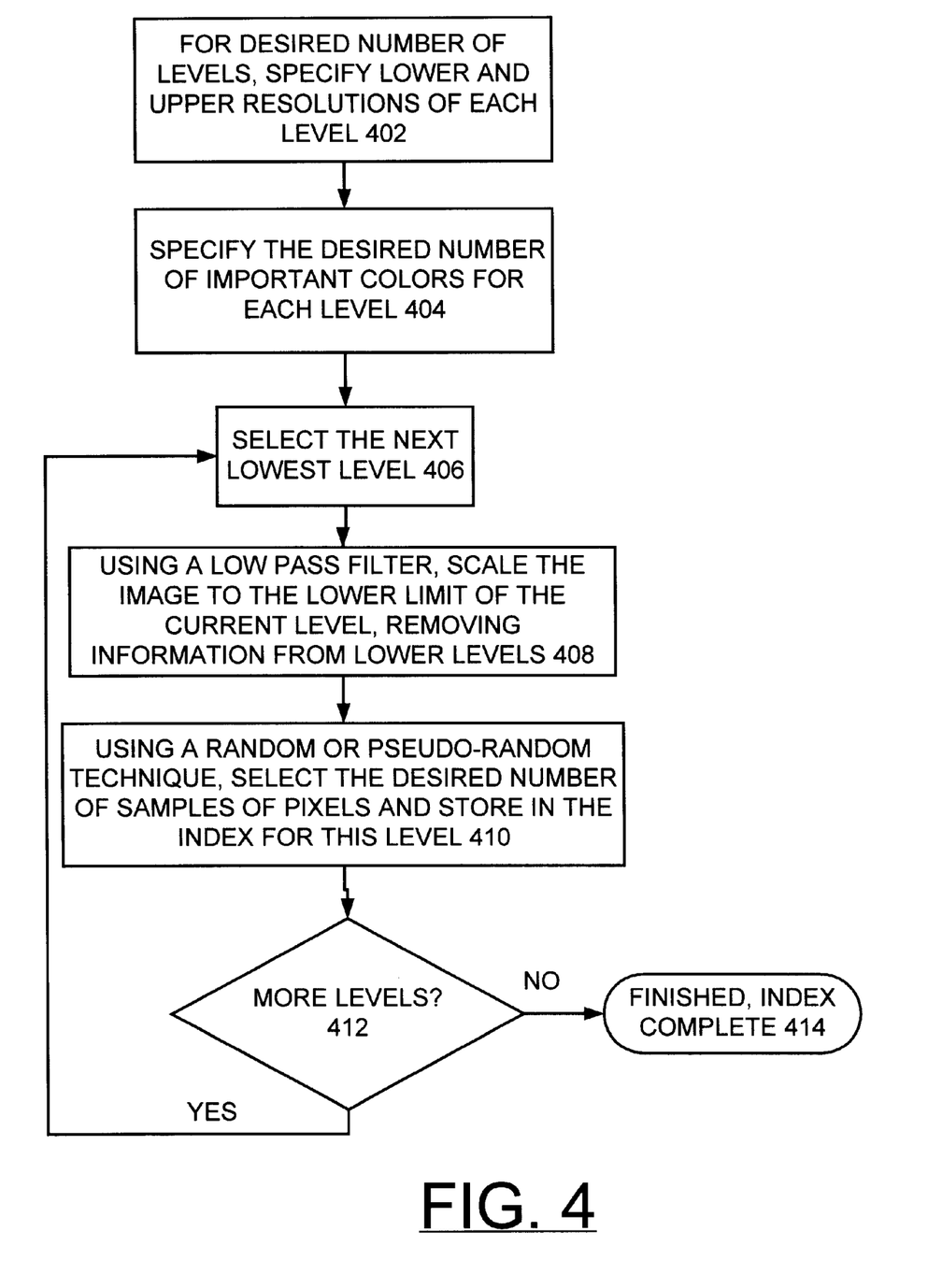

Referring to FIG. 4, there are shown another method of the preferred embodiment for creating an index. As indicated at a block 402, for each of the desired number of levels, upper and lower resolutions are specified. A desired number of important colors for each level is specified as indicated at a block 404. A next lowest level is selected as indicated at a block 406. Using a low pass filter, the image is scaled to the lower limit (higher resolution) of the current level, removing information from lower levels as indicated at a block 408. Then using a random or pseudo-random sampling technique, a desired number of pixel samples is obtained and stored in the index for this level as indicated at a block 410. Then checking for more levels is performed as indicated at a decision block 412. If there are more levels to process, then the sequential operations return to block 406 to select the next lowest level. When no more levels to process are identified at decision block 412, then the index for the current image is complete as indicated at a block 414.

Referring to FIG. 5, there are shown another method of the preferred embodiment for creating an index. As indicated at a block 502, for each of the desired number of levels, upper and lower resolutions are specified. A desired population threshold for image colors for each level is specified as indicated at a block 504. A next lowest level is selected as indicated at a block 506. Using a low pass filter, the image is scaled to the lower limit (higher resolution) of the current level, removing information from lower levels as indicated at a block 508. Then a histogram of the pixels is generated using a variable size for the histogram bins depending on the precision desired as indicated at a block 510. Then colors of pixel samples are selected that have a population greater than a defined threshold population and stored in the index for this level as indicated at a block 512. Then checking for more levels is performed as indicated at a decision block 514. If there are more levels to process, then the sequential operations return to block 506 to select the next lowest level. When no more levels to process are identified at decision block 514, then the index for the current image is complete as indicated at a block 516.

Referring to FIG. 6, there are shown another method of the preferred embodiment for creating an index. As indicated at a block 602, for each of the desired number of levels, upper and lower resolutions are specified. A desired number of important colors for each level is specified as indicated at a block 604. A next lowest level is selected as indicated at a block 606. Using a low pass filter, the image is scaled to the lower limit (higher resolution) of the current level, removing information from lower levels as indicated at a block 608. Then a histogram of the pixels is generated using a variable size for the histogram bins depending on the precision desired as indicated at a block 610. Then colors of pixel samples is selected from the desired number of important colors that occur most frequently and are stored in the index for this level as indicated at a block 612. Then checking for more levels is performed as indicated at a decision block 614. If there are more levels to process, then the sequential operations return to block 606 to select the next lowest level. When no more levels to process are identified at decision block 614, then the index for the current image is complete as indicated at a block 616.

In FIGS. 2–6, it should be understood that a single level can be defined. In FIGS. 3–6, the step of specifying the desired number of important colors for each level at respective blocks 304, 404, 504 and 604 are optional steps. It should be understood that a fixed number is not required for the desired number of important colors for each level. The desired number of important colors for each level can also be defined as colors with a frequency greater than a certain threshold percentage or as a default value. In FIGS. 5 and 6, the deterministic technique of block 310 of FIG. 3 or the random or pseudo-random technique of block 410 of FIG. 4 can be used to select pixels to be input to the histogram step at blocks 510 and 610.

Referring to FIG. 7, there is shown an exemplary index data structure 700 in accordance with the preferred embodiment. The index structure 700 includes a number of levels 702 and each level number 704 includes a lower resolution 706 and an upper resolution 708. Each level number 704 can include a number of important colors 710, a size of the histogram bins 712, and a histogram threshold 714. The index structure 700 includes a number of colors 720 and each color number 722 includes a plurality of color space coordinates (C1, C2, C3) 724, 726, and 728. Each color number 722 includes a number of pixels 730 and a percent % of image value 732. It should be understood that not all the fields of the exemplary data structure 700 are required and some may never be used. Also various other equivalent storage formats for the illustrated fields of the exemplary data structure 700 can be used. Also the threshold may vary for each color.

Figure 8:
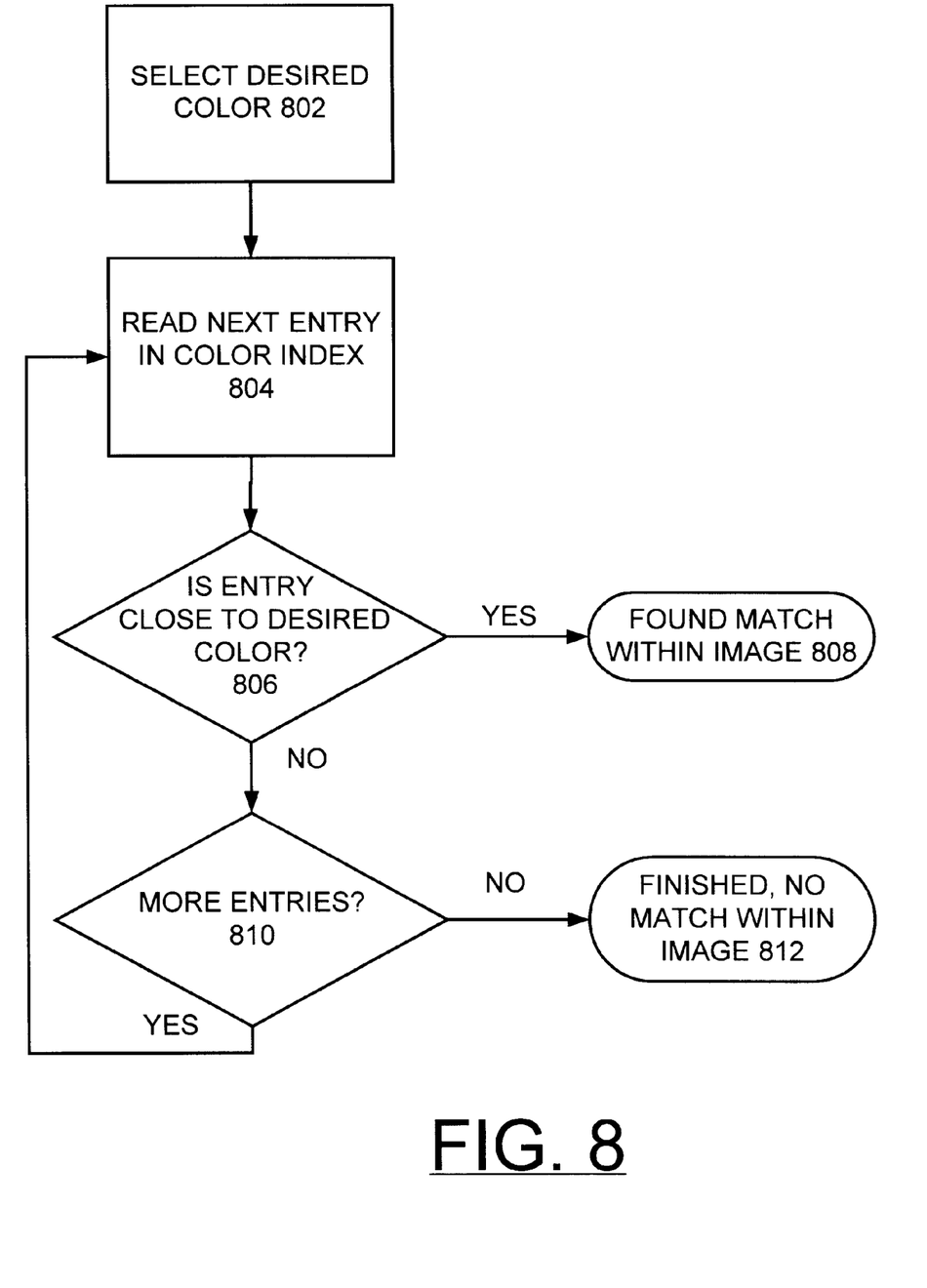
FIGS. 8, 9, 10 and 11 are flow charts illustrating sequential steps for searching and querying by image colors images from the internet in accordance with the preferred embodiment.

Referring now to FIG. 8, there are shown sequential steps for querying by image colors images from the internet in accordance with the preferred embodiment. First a desired image color is selected as indicated at a block 802. A next entry of the color index is read as indicated at a block 804. The entry is compared with the selected image color as indicated at a decision block 806. If the entry is close to the selected image color, then a match is found within the image being processed as indicated at a block 808. If the acquired entry is not close to the selected image color, then checking for more entries is performed as indicated at a decision block 810. If more entries are found, then the sequential operation return to block 804 to read the next entry in the color index. Otherwise, when no more entries are found; then the color image query processing is finished with no match found within the image as indicated at a block 812.

Figure 9:
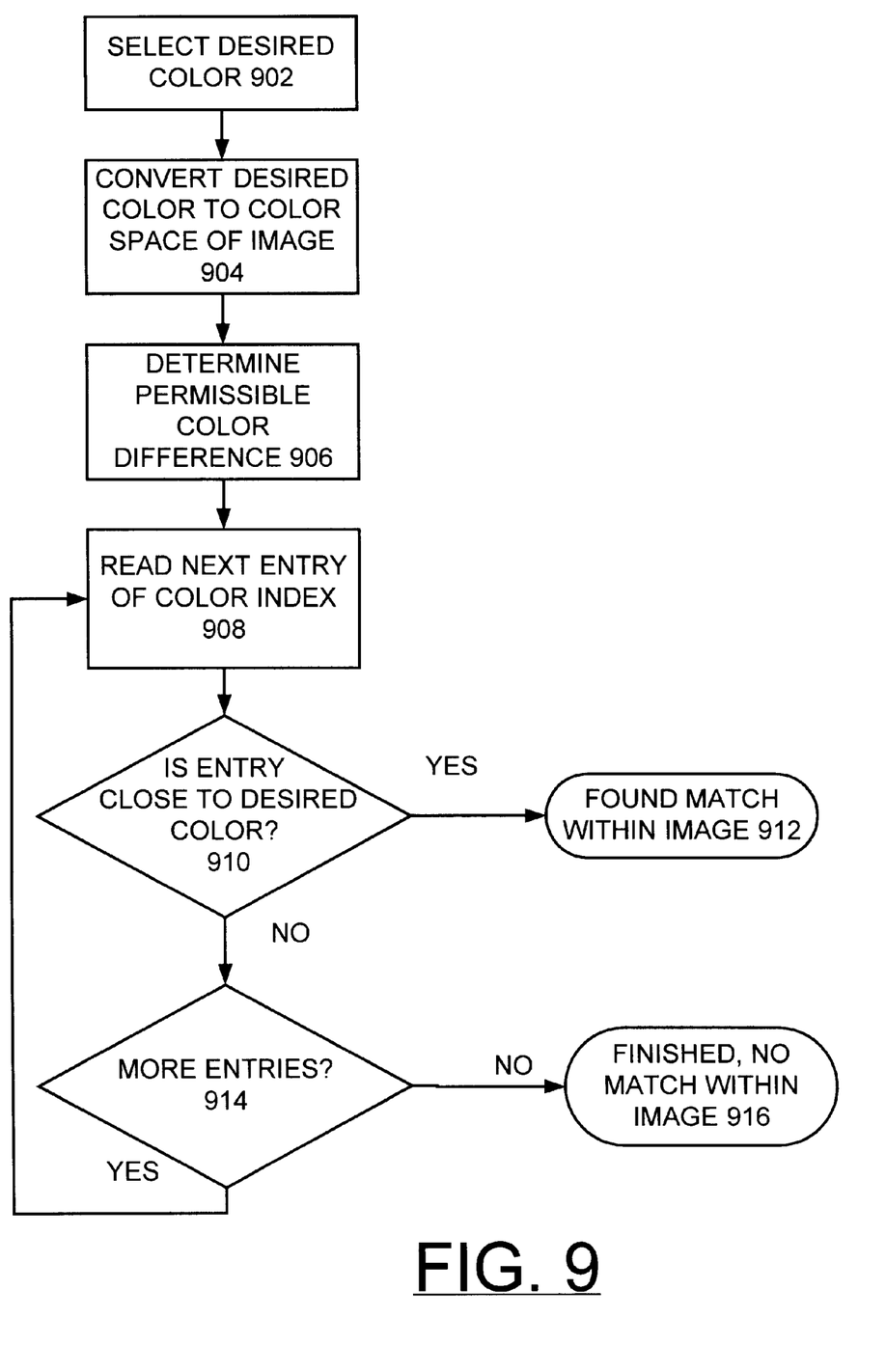

Referring now to FIG. 9, there are shown sequential steps for querying by image colors in accordance with another method of the preferred embodiment. In FIG. 9, first a desired image color is selected as indicated at a block 902. Then the selected desired color obtained at block 902 is converted to a color space of the image as indicated at a block 904. A permissible color difference is determined as indicated at a block 906. A next entry of the color index is read as indicated at a block 908. The entry is compared with the desired color as indicated at a decision block 910. If the entry is close to the selected image color, then a match is found within the image being processed as indicated at a block 912. If the entry is not close to the selected image color, then checking for more entries is performed as indicated at a decision block 914. If more entries are found, then the sequential operation return to block 906 to read the next entry of the color index. Otherwise, when no more entries are found; then the color image query processing is finished with no match found within the image as indicated at a block 916.

Figure 10:
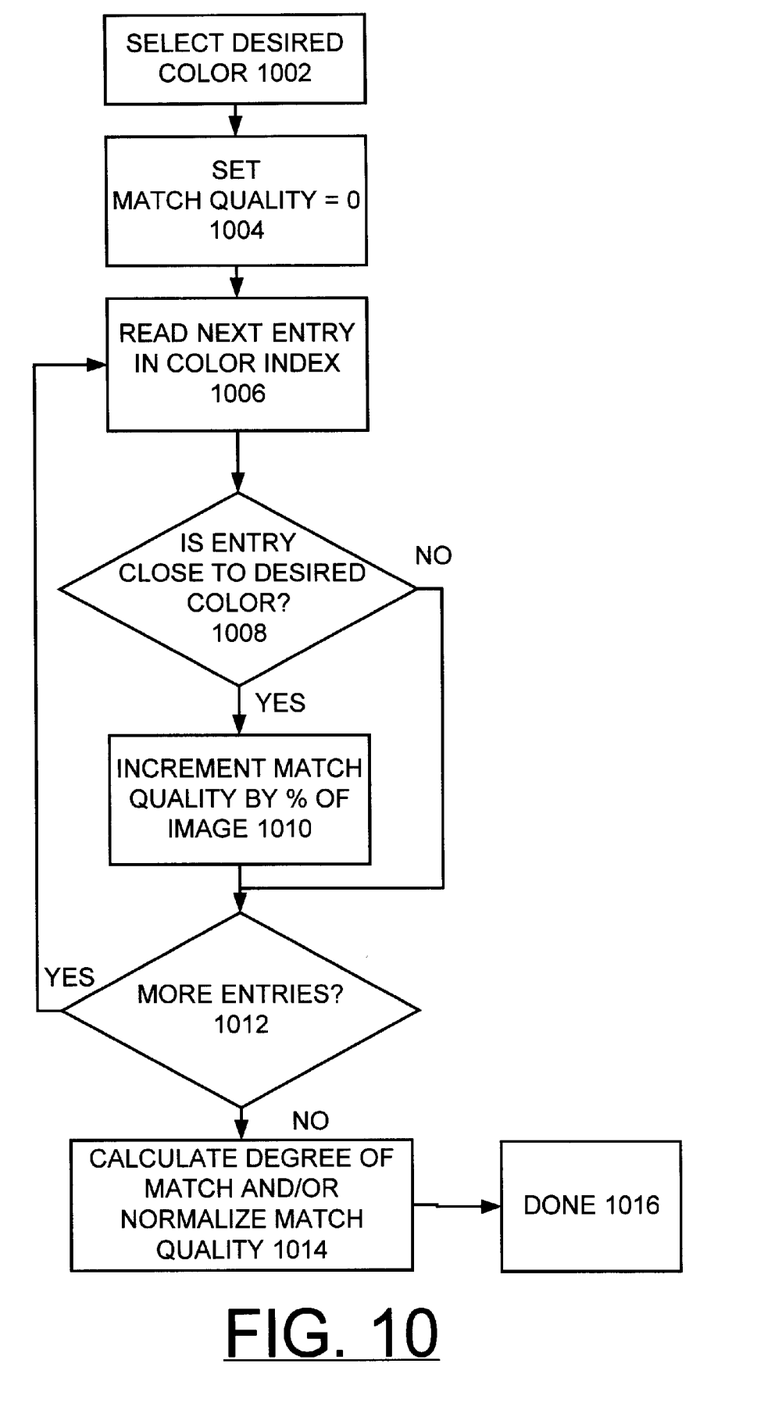

Referring now to FIG. 10, there are shown sequential steps for querying by image colors in accordance with another method of the preferred embodiment. First a desired image color is selected as indicated at a block 1002. Then a match quality value is initially set to zero as indicated at a block 1004. A next entry of the color index is read as indicated at a block 1006. The acquired entry is compared with the selected image color as indicated at a decision block 1008. If the acquired entry is close to the selected image color, then the match quality value is incremented by a percent of the image as indicated at a block 1010. If the acquired entry is not close to the selected image color or after the match quality value is incremented, then checking for more entries is performed as indicated at a decision block 1012.the entries are found, then the sequential operation return to block 1006 to read the next entry in the color index. Otherwise, when no more entries are found; then a degree of match is calculated and/or the match quality is normalized as indicated at a block 1014. This completes the color image query processing as indicated at a block 1016.

Note that other techniques could be used to calculate the degree of match or normalize match quality. For example, a match quality could be computed based upon the closeness of the match in color space and summed and normalized to get the degree of match. Alternatively, match quality could be computed based upon the closeness of the match to a desired level and/or the closeness of the pixel to the desired location within the image, and summed and normalized to get the degree of match. Also a combination of these above methods could be used. The degree of match can be implemented as a lookup table to provide equivalent results.

Figure 11:
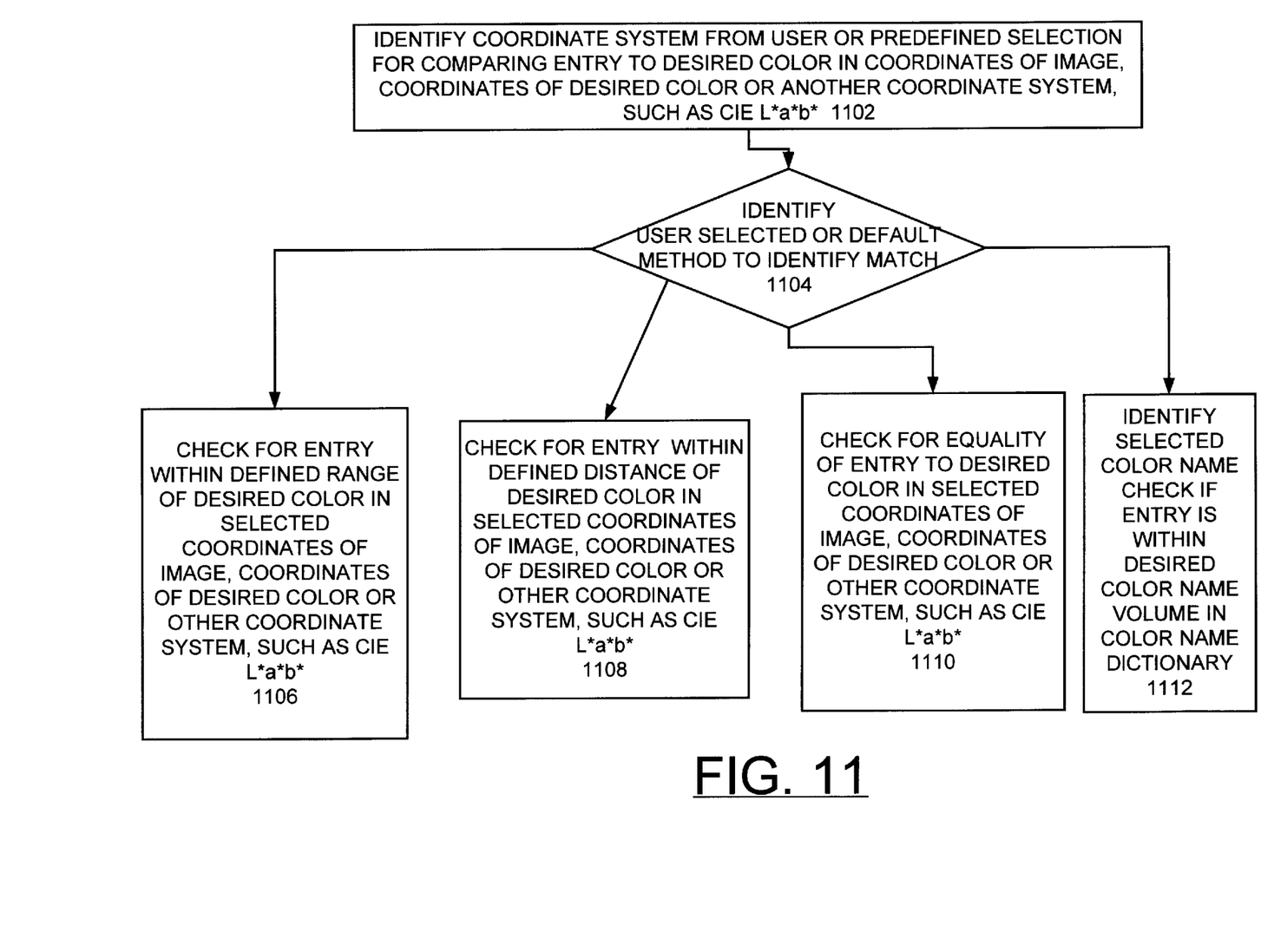

Referring now to FIG. 11, there are shown exemplary more detailed alternative steps performed in accordance with the preferred embodiment to determine whether an entry is close to the selected image color. As indicated at a block 1102, a coordinate system is identified from a user selection or a default selection in the coordinates of the image, of the desired color or another coordinate system, such as CIE L*a*b* that is used for comparing and determining whether the acquired entry is close to the selected image color. As indicated at a decision block 1104, a user selected or default method is identified that is used for determining whether the acquired entry is close to the selected image color to identify a match.

Checking that the acquired entry is within a defined range of the selected image color in the selected coordinates of the image, of the desired color or another coordinate system, such as CIE L*a*b* is performed as indicated at a block 1106.

Checking that the acquired entry is within a defined distance of the selected image color in the selected coordinates of the image, of the desired color or another coordinate system, such as CIE L*a*b* is performed as indicated at a block 1108. For example, the square root of the sum of the squares of distance in each independent quadrant axis can be used in checking that the acquired pixel or pixel average is within a defined distance of the selected image color.

Checking for equality of the entry to the selected image color in the selected coordinates of the image, of the desired color or another coordinate system, such as CIE L*a*b* is performed as indicated at a block 1110.

Identifying a selected color name and checking whether the entry is within the selected image color name volume in a color name dictionary is performed as indicated at a block 1112. A color name dictionary and color name volumes are provided as disclosed in copending U.S. patent application Ser. No. 08/749,150 filed Nov. 14, 1996 by Helen R. Delp and entitled "METHOD AND APPARATUS FOR CREATING A COLOR NAME DICTIONARY AND FOR QUERYING AN IMAGE BY COLOR NAME." The subject matter of the above-identified patent application is incorporated herein by reference.

It should be understood that in certain situations for reasons of computational efficiency or ease of maintenance, the ordering of the blocks of the illustrated flow charts could be rearranged or moved inside or outside of the illustrated loops by one skilled in the art. It is possible that the coordinate system of the image and/or the coordinate system of the desired color would be unknown. For this reason or for reasons of computational efficiency, it could be assumed that the coordinate systems of the image and the desired color are the same.

Figure 12:
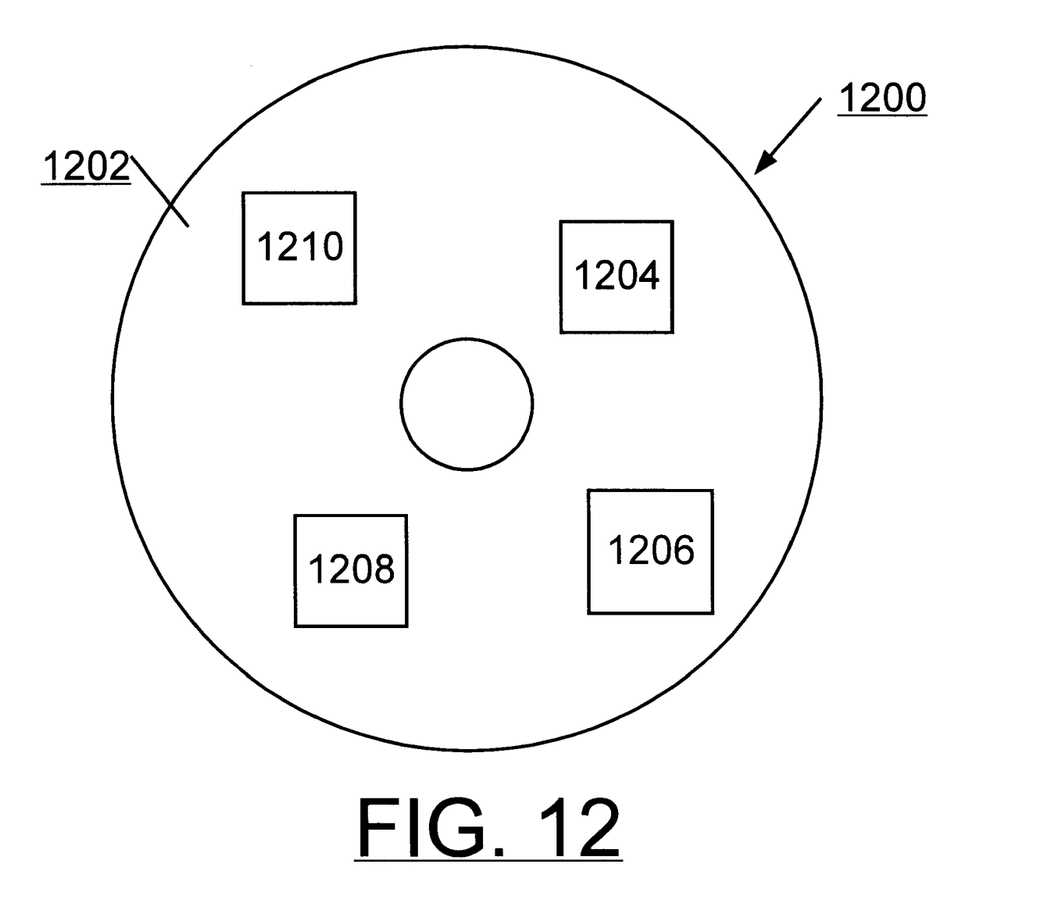
FIG. 12 is a block diagram illustrating a computer program product in accordance with the preferred embodiment.

Referring now to FIG. 12, an article of manufacture or a computer program product 1200 of the invention is illustrated. The computer program product 1200 includes a recording medium 1202, such as, a floppy disk, a high capacity read only memory in the form of an optically read compact disk or CD-ROM, a tape, a transmission type media such as a digital or analog communications link, or a similar computer program product. Recording medium 1202 stores program means 1204, 1206, 1208, 1210 on the medium 1202 for carrying out the methods for building an index and for querying images by image color of the preferred embodiment in the system 100 of FIG. 1.

A sequence of program instructions or a logical assembly of one or more interrelated modules defined by the recorded program means 1204, 1206, 1208, 1210, direct the computer system 100 for building an index and for searching and querying by image colors from images from the internet of the preferred embodiment.

While the present invention has been described with reference to the details of the embodiments of the invention shown in the drawing, these details are not intended to limit the scope of the invention as claimed in the appended claims.

What is claimed is:

1. A computer program product for use in a computer system for building an index by image colors from a plurality of images including images from the internet, said computer program product comprising:

a recording medium;

means, recorded on the recording medium, for identifying a selected number of levels for image processing, and for identifying an upper resolution and a lower resolution for each of said selected number of levels for image processing;

means, recorded on the recording medium, for filtering an image at each said selected level for image processing of said filtered image; and means, recorded on the recording medium, for acquiring and storing a sample of pixels at each said selected level for image processing of said filtered image.

2. A computer program product as recited in claim 1 includes means, recorded on the recording medium, for identifying a selected number of important colors.

3. A computer program product as recited in claim 1 wherein said means, recorded on the recording medium, for acquiring and storing said sample of pixels at each selected level includes means, recorded on the recording medium, for utilizing a random, a pseudo-random or a deterministic method, and for acquiring and storing said sample of pixels at each said selected level for image processing of said filtered image in said index.

4. A computer program product as recited in claim 1 wherein said means, recorded on the recording medium, for acquiring and storing said sample of pixels at each selected level includes means, recorded on the recording medium, for generating a histogram of pixels by image color and for utilizing said histogram for acquiring and storing said sample of pixels at each said selected level for image processing of said filtered image in said index.

5. A computer program product as recited in claim 4 wherein said means, recorded on the recording medium, for acquiring and storing said sample of pixels at each said selected level includes means, recorded on the recording medium, for identifying a selected number of important colors and for utilizing said selected number of important colors and said histogram for acquiring and storing said sample of pixels at each said selected level for image processing of said filtered image in said index.

6. A computer program product as recited in claim 4 includes means, recorded on the recording medium, for identifying a histogram threshold for selecting a number of important colors.

7. A computer program product for use in a computer system for querying by image colors from a plurality of images including images from the internet, said computer program product comprising:

a recording medium;

an index by image colors from the plurality of images including images from the internet stored on said recording medium;

means, recorded on the recording medium, for selecting an image color;

means, recorded on the recording medium, for acquiring an index entry from said index;

means, recorded on the recording medium, for comparing said acquired index entry with said selected image color; and means, recorded on the recording medium, for identifying a match responsive to said acquired index entry being near said selected image color.

8. A computer program product as recited in claim 7 includes means, recorded on the recording medium, for building said index for each of the plurality of images.

9. A computer program product as recited in claim 7 includes said means, recorded on the recording medium, for identifying a selected coordinate system for comparing said acquired index entry with said selected image color.

10. A computer program product as recited in claim 7 includes means, recorded on the recording medium, for calculating a match quality value responsive to each identified match of said acquired index entry and said selected image color.

11. A computer program product as recited in claim 7 wherein said means, recorded on the recording medium, for identifying said match responsive to said acquired index entry being near said selected image color includes means, recorded on the recording medium, for identifying a permissible color difference between said acquired pixel and said selected image color for identifying a match.

12. A computer program product as recited in claim 7 wherein said means, recorded on the recording medium, for identifying said match responsive to said acquired entry being near said selected image color includes means, recorded on the recording medium, for identifying a predefined distance or for identifying a predefined range, and wherein said means, recorded on the recording medium, for identifying said match is responsive to said acquired index entry being within said predefined distance or within said predefined range of said selected image color.

13. A computer program product as recited in claim 7 wherein said means, recorded on the recording medium, for identifying said match responsive to said acquired entry being near said selected image color includes means, recorded on the recording medium, for identifying said match is responsive to said acquired index entry being equal to said selected image color.

14. A computer implemented method for building an index by image colors from a plurality of images including images from the internet, said method comprising the steps of:

identifying a selected number of levels for image processing, and identifying an upper resolution and a lower resolution for each of said selected number of levels for image processing;

filtering an image at each selected level between said upper resolution and said lower resolution for image processing; and acquiring and storing a sample of pixels at each selected level from said filtered image.

15. A method for querying by image colors from a plurality of images as recited in claim 14 wherein the steps of identifying said selected number of levels for image processing, and identifying said upper resolution and said lower resolution includes the step of either receiving user selections or identifying stored default values.

16. A computer implemented method for building an index by image colors as recited in claim 14 includes the step of identifying a selected number of important colors.

17. A computer implemented method for building an index by image colors as recited in claim 14 wherein the step of acquiring and storing said sample of pixels at each selected level from said filtered image includes the steps of, utilizing a random, a pseudo-random or a deterministic method, and acquiring and storing a sample of pixels at each selected level in said index.

18. A computer implemented method for building an index by image colors as recited in claim 14 wherein the step of acquiring and storing said sample of pixels at each selected level from said filtered image includes the steps of generating a histogram of pixels by image color and utilizing said histogram for acquiring and storing a sample of pixels at each selected level in said index.

19. A computer implemented method for building an index by image colors as recited in claim 18 wherein the step of acquiring and storing said sample of pixels at each selected level from said filtered image includes the steps of identifying a selected number of important colors and utilizing said selected number of important colors and said histogram for acquiring and storing said sample of pixels at each selected level in said index.

20. A computer implemented method for building an index by image colors as recited in claim 18 includes the step of identifying a histogram threshold for selecting a number of important colors.

21. A method for querying by image colors from a plurality of images including images from the internet comprising the steps of:

building an index by image colors from a plurality of images including images from the internet;

selecting an image color;

acquiring an index entry from said index;

comparing said acquired index entry with said selected image color; and identifying a match responsive to said acquired index entry being near said selected image color.

22. A method for querying by image colors from a plurality of images as recited in claim 21 includes the step of calculating a match quality value responsive to each identified match of said acquired index entry and said selected image color.

23. A method for querying by image colors from a plurality of images as recited in claim 21 wherein the step of identifying said match responsive to said acquired index entry being near said selected image color includes the step of identifying a selected coordinate system for comparing said acquired index entry with said selected image color.

24. A method for querying by image colors from a plurality of images as recited in claim 21 wherein the steps of comparing said acquired index entry with said selected image color; and identifying said match responsive to said acquired index entry being near said selected image color include the step of identifying said match responsive to said acquired index entry being within a predefined distance of said selected image color.

25. A method for querying by image colors from a plurality of images as recited in claim 21 wherein the steps of comparing said acquired index entry with said selected image color; and identifying said match responsive to said acquired index entry being near said selected image color include the step of identifying said match responsive to said acquired entry being within a defined range of said selected image color.

26. A method for querying by image colors from a plurality of images as recited in claim 21 wherein the steps of comparing said acquired index entry with said selected image color; and identifying said match responsive to said acquired index entry being near said selected image color include the step of identifying said match responsive to said acquired index entry being equal to said selected image color.

27. A computer system having apparatus for building an index by image colors for a plurality of images including images from the internet, said computer system comprising:

a processor, a memory;

a communications adapter;

a bus connecting said processor, memory, and communications adapter;

means for identifying a selected number of levels for image processing, and for identifying an upper resolution and a lower resolution for each of said selected number of levels for image processing;

means for filtering an image at each selected level for image processing between said upper resolution and said lower resolution; and means for acquiring and for storing a sample of pixels at each selected level from said filtered image.

28. A computer system having apparatus for querying by image colors from a plurality of images including images from the internet, said computer system comprising:

a processor, a memory;

a communications adapter;

a bus connecting said processor, memory, and communications adapter;

means for building an index by image colors from the plurality of images;

means for selecting an image color;

means for acquiring an index entry from said index;

means for comparing said acquired index entry with said selected image color; and means for identifying a match responsive to said acquired index entry being near said selected image color.

* * * * *